Oct. 12, 1954 A. C. BECK ET AL 2,691,734
FREQUENCY STABILIZED OSCILLATOR
Filed May 17, 1946
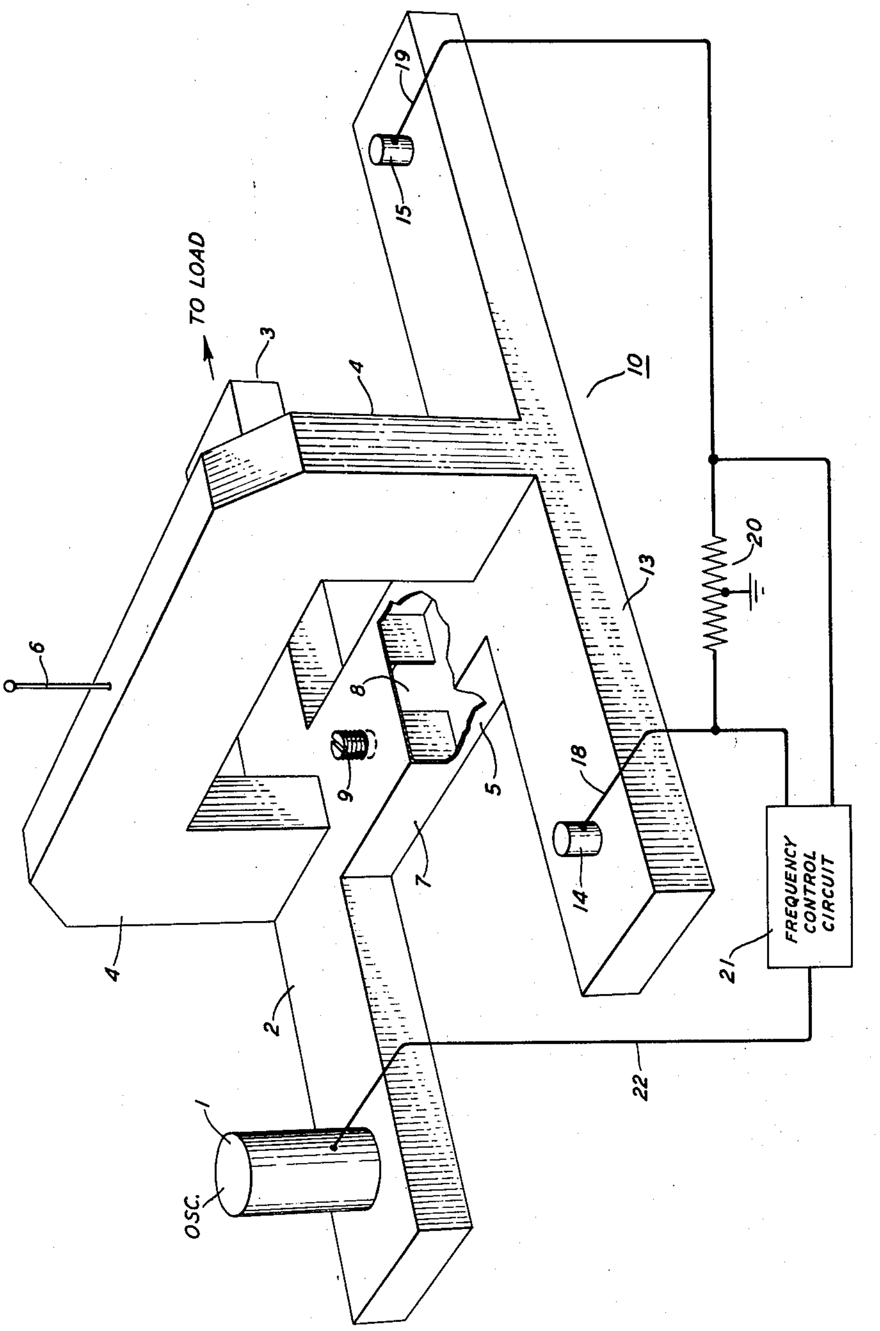
INVENTORS: A. C. BECK
D. H. RING
BY George C. Ford
ATTORNEY Patented Oct. 12, 1954 2,691,734

UNITED STATES PATENT OFFICE 2,691,734

FREQUENCY STABILIZED OSCILLATOR

Alfred C. Beck and Douglas H. Ring, Red Bank, N. J., assignors to Bell Telephone Laboratories, Incorporated, New York, N. Y., a corporation of New York Application May 17, 1946, Serial No. 670,384

6 Claims. (Cl. 250—36)

This invention relates to frequency discriminators for microwave systems.

One type of frequency discriminator circuit widely used at lower frequencies operates on the principle of separately rectifying the sum and the difference of two voltages that differ in phase by ninety degrees at the nominal or mean frequency of the system. By the use of a frequency responsive circuit, such as a circuit resonant at the nominal frequency, one of these component voltages is caused to vary in phase as the frequency departs from the nominal value. Accordingly the differential combination of the rectified voltages will be a voltage varying in magnitude and polarity with deviations of the input from the nominal frequency. Such circuits have in the past been built up of circuit elements of lumped constants which is not practical for operation in the microwave range.

It is an object of the present invention to provide a frequency discriminator employing elements of distributed constants suitable for operation at microwave frequencies.

The invention may be best understood from the following detailed description of one embodiment thereof as shown in the drawing which is a combined perspective view and block schematic circuit drawing.

The drawing shows a microwave oscillator which is provided with a frequency regulating system. Thus, the microwave oscillator tube 1 which is of the velocity modulation type feeds the main wave guide 2 of rectangular cross-section. The feed may be by means of a probe extending into the guide 2 through an orifice in the upper face which is wider than the vertical faces of the guide. This produces in the guide dominant waves in which the lines of electric intensity are parallel to the narrower faces of the guide. The right-hand end 3 of the guide 2 is intended for feeding to a load circuit (not shown).

At a suitable point along the main wave guide 2 branch wave guides 4 and 5 supply waves to the hybrid wave guide junction 10, that is of the type disclosed and claimed in the copending application of W. A. Tyrrell, Serial No. 581,285, filed March 6, 1945, Patent 2,445,896 of July 27, 1948. The characteristics of these branch wave guides 4 and 5 will be described in detail later.

The hybrid junction 10 comprises a main wave guide 13 and the branch wave guides 4 and 5 so relatively disposed that their longitudinal axes extend in mutually perpendicular planes, the branches 4 and 5 connecting to the main guide 13 at its center. The wider faces of the guide 4 are normal to the direction in which the main guide 13 extends and the narrower faces of the guide 4 are parallel to that direction. This is a connection in the electric plane, that is the plane parallel to the lines of electric intensity produced in the guides when dominant waves are propagated towards their junction and is equivalent to a series electrical connection. The narrower faces of the branch guide 5 are normal to the direction in which the main guide 13 extends and the wider faces of guide 5 are parallel thereto. This is a connection in the magnetic plane, that is the plane perpendicular to the plane of electric intensity and is equivalent to a shunt or parallel electrical connection.

The two portions of the main wave guide 13 extending on opposite sides of the common junction with the branch wave guides 4 and 5 are of equal length and are closed at their outer ends by reflecting plates. Point contact crystal rectifiers 14 and 15 are mounted in the wave guide 13 at such distances from the closed ends as to provide an effective impedance match. The arrangement for mounting the rectifiers 14 and 15 may be that shown in the copending application of Sharpless, Serial No. 578,030, filed February 15, 1945, Patent 2,438,521 of March 30, 1948. The rectified outputs from the crystal rectifiers 14 and 15 are taken off through the connections 18 and 19 and applied to the resistor 20 that is grounded at its midpoint.

The branch wave guides 4 and 5 supplying output waves of the oscillator 1 in the main wave guide 2 to the hybrid junction 10 are arranged so that they have a difference in length equal to an odd integral multiple of a quarter wavelength of the output waves from the oscillator 1 at its normal frequency. In this way inputs from the guides 4 and 5 to the wave guide T 10 are caused to be in phase quadrature. In order to maintain this quadrature relation there is provided in the branch guide 4 a wave guide phase shifter having an adjusting handle 6. This phase shifter may be of the type shown in the abandoned application of D. H. Ring, Serial No. 640,495, filed January 11, 1946 and the corresponding British Patent 641,227 of August 29, 1950. The phase shifter permits adjustments to take care of manufacturing variations in the wave guides or minor changes in the nominal frequency of the oscillator 1.

One of the wave guide branches, as shown branch 5, includes a resonant cavity 7 provided at each end with an iris for coupling to the other portions of the wave guide system. The output iris 8 is shown at the broken section of the walls of the guide 5. An adjustable tuning plug 9 is provided for tuning the resonant cavity 7 to the nominal frequency of the oscillator 1.

The branch wave guides 4 and 5 are coupled to guide 2 by small irises adjusted to extract only a small portion of the energy from 2 and are matched to the main guide 13 of the hybrid junction 10 by means of irises (not shown) or by the use of the impedance matching system shown in the copending application of C. F. Edwards, Serial No. 637,124 of December 24, 1945. In this way impedance irregularities at the junction points are avoided.

The terminals of the resistor 20 are connected to the input of the frequency control circuit 21 that has its output connected through the connection 22 to the oscillator 1 to regulate its frequency. This frequency control circuit 21 may be a direct current amplifier and the output, amplified direct current voltage be applied through the connection 22 to the reflector electrode of the reflex oscillator 1 and the frequency of its output thus controlled in a manner well understood in the art. Instead of using a purely electrical control, it may be found preferable in some applications to employ a mechanical link. In such cases the control circuit 21 would comprise one of the types of servomechanical systems known in the art.

In the operation of the system waves supplied by the oscillator 1 through the branch wave guide 4 to the main guide 13 of the hybrid T produce voltages of opposite phase in the rectifiers 14 and 15. On the other hand the voltages produced across the rectifiers 14 and 15 by waves from the branch wave guide 5 will be of like phase. Now, at the nominal frequency of the oscillator 1 to which the resonant chamber 7 is tuned the waves introduced into the wave guide 13 by the respective wave guides 4 and 5 are in phase quadrature. As a result of this fact the respective voltages produced by the rectifiers each of which is proportional to the vector sum of voltages impressed thereacross will be equal and consequently the voltage produced across the resistor 20 will be zero. On the other hand if the frequency of the waves generated by the oscillator 1 varies from the frequency to which the resonant cavity 7 is tuned, the phase of the voltages across the rectifiers 14 and 15 due to waves from the branch guide 5 will depart from the quadrature relation to the voltages due to waves from the guide 4 and the direction of the phase departure will depend upon whether the frequency decreases or increases. As a result the voltage produced across one of the rectifiers will increase and that produced across the other will decrease. Accordingly there will be produced across the resistor 20 a voltage of one sign for variations in the frequency of the oscillator 1 in one direction and a voltage of the opposite sign for frequency variations in the opposite direction. This is analogous to the operation of well-known frequency discriminator of the lumped circuit type.

The voltage developed across the resistor 20 after amplification in the direct current amplifier 21 is employed to regulate the frequency of the oscillator 1. Thus no voltage is available in the connection to the frequency control circuit 21 when the oscillator is operating at the proper frequency, that is the frequency to which the resonant cavity 7 is tuned. However when the frequency of the output of the oscillator 1 varies in either direction from that value a voltage of the proper sign to cause a correction in the desired direction is applied through the connection 22 to the reflex electrode of the oscillator.

What is claimed is:

1. In combination, three branching hollow pipe wave guides each of rectangular cross-section, extending longitudinally in mutually perpendicular directions from a common junction point with the wider faces of two of said guides normal to one of said directions and with the wider faces of the third of said guides normal to another of said directions, one of said two guides extending longitudinally to each side of said common junction point, a source of electromagnetic wave energy, wave paths for supplying energy from said source toward said junction point through the other of said two guides and through said third guide, one of said wave paths differing in length from the other by one-quarter wavelength at the nominal frequency of said source, means selective to the nominal frequency of said source in one of said wave paths, and a rectifier in each branch of said one of said two guides.

2. A combination according to claim 1 in which said means selective to the nominal frequency of said source is a resonant wave cavity tuned to the nominal frequency of said source.

3. In a frequency discriminator, a source of waves, a pair of rectifiers, a dielectric wave guide branch for supplying waves to each of said rectifiers, a pair of dielectric wave guide paths differing in effective length from input to output by a quarter wavelength at the frequency of waves from said source, means for supplying waves from said source to the input of each of said pair of dielectric wave guides, dielectric wave guide connections between the output of one of said pair of dielectric wave guide paths and said two dielectric wave guide branches for supplying waves from said one path to said branches in like phase, dielectric wave guide connections between the output of the other of said pair of dielectric wave guide paths and said two dielectric wave guide branches for supplying waves from said other path to said branches in opposite phase, and an element resonant at the frequency of waves from said source in one of said paths.

4. A discriminator comprising a wave guide, a wave guide section, two branch wave guides extending from said first wave guide for transmitting wave energy of high variable frequency from said first wave guide to said wave guide section at junctions intermediate the ends thereof, said branch guides differing in electrical length by an odd number of quarter wavelengths at a predetermined frequency to effect at said frequency a time quadrature relation of the energies transmitted by them to said section and so joined to said section that the energy transferred from one of them divides for propagation in opposite directions from its junction with like instantaneous polarizations whereas the energy transferred from the other of them divides for propagation in opposite directions from its junction with opposite instantaneous polarizations, a resonant cavity interposed in one of said branch guides for shifting the phase of energy transmitted thereby in sense and to extent determined by the sense and extent of deviation of the frequency of said energy from said predetermined frequency, and means responsive to the vector sums of the electric fields on opposite sides of said junctions for production jointly of a current whose polarity and magnitude correspond with the sense and magnitude of said frequency deviation.

5. An ultra-short wave emitter system including a generator of ultra-high frequency, means for feeding said generator, a dielectric guide excited by said generator, at least one branch guide section on this guide including a detector, means for picking up at the output end of this detector a current responsive to the frequency variations of the generator due to the deviations of the feed means from a predetermined condition, and means for injecting the said current in the said feed means so as to reduce the said deviations of the said feed means from the said predetermined conditions.

6. An ultra-short wave emitter system including a generator of ultra-high frequency, means for feeding said generator, a dielectric guide excited by said generator, two branch guide sections on this guide each including a detector, means for opposing the output currents of these detectors so as to obtain a differential current responsive to the frequency variations of the generator due to the deviations of the feed means from a predetermined condition, and means for injecting the said differential current in the said feed means so as to reduce the said deviations of the said feed means from the predetermined conditions.

References Cited in the file of this patent

UNITED STATES PATENTS

| Number | Name | Date |
|---|---|---|
| 2,312,079 | Crosby | Feb. 23, 1943 |
| 2,462,841 | Bruck et al. | Mar. 1, 1949 |